United States Patent
Boyle et al.

(10) Patent No.: US 7,929,234 B1
(45) Date of Patent: Apr. 19, 2011

(54) DISK DRIVE PRIORITIZING IN-THE-FIELD DEFECT SCANNING BASED ON NUMBER OF WRITE OPERATIONS IN EACH OF A PLURALITY OF DEFECT ZONES

(75) Inventors: William B. Boyle, Lake Forest, CA (US); Chun Sei Tsai, Tustin, CA (US); Anthony L. Pei, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 173 days.

(21) Appl. No.: 12/413,408

(22) Filed: Mar. 27, 2009

(51) Int. Cl.
*G11B 27/36* (2006.01)

(52) U.S. Cl. .......................... 360/31; 360/53
(58) Field of Classification Search .................. None
See application file for complete search history.

(56) References Cited

U.S. PATENT DOCUMENTS

| | | | |
|---|---|---|---|
| 4,939,598 A * | 7/1990 | Kulakowski et al. ........... 360/48 |
| 5,696,775 A | 12/1997 | Nemazie et al. | |
| 5,937,435 A | 8/1999 | Dobbek et al. | |
| 5,966,726 A | 10/1999 | Sokolov | |
| 6,002,544 A | 12/1999 | Yatsu | |
| 6,018,789 A | 1/2000 | Sokolov et al. | |
| 6,101,065 A | 8/2000 | Alfred et al. | |
| 6,134,214 A | 10/2000 | Takagi et al. | |
| 6,289,484 B1 | 9/2001 | Rothberg et al. | |
| 6,327,106 B1 | 12/2001 | Rothberg | |
| 6,408,357 B1 | 6/2002 | Hanmann et al. | |
| 6,412,089 B1 | 6/2002 | Lenny et al. | |
| 6,429,984 B1 | 8/2002 | Alex | |
| 6,442,715 B1 | 8/2002 | Wilson | |
| 6,532,517 B1 | 3/2003 | Wagner et al. | |
| 6,535,995 B1 | 3/2003 | Dobbek | |
| 6,545,835 B1 * | 4/2003 | Codilian et al. ........... 360/77.04 |
| 6,606,211 B1 | 8/2003 | Lim et al. | |
| 6,611,393 B1 | 8/2003 | Nguyen et al. | |
| 6,628,466 B2 | 9/2003 | Alex | |
| 6,650,492 B2 | 11/2003 | Lenny et al. | |
| 6,654,193 B1 | 11/2003 | Thelin | |
| 6,690,523 B1 | 2/2004 | Nguyen et al. | |
| 6,707,635 B1 | 3/2004 | Codilian et al. | |
| 6,710,953 B1 | 3/2004 | Vallis et al. | |
| 6,745,283 B1 | 6/2004 | Dang | |
| 6,795,894 B1 | 9/2004 | Neufeld et al. | |
| 6,809,893 B2 | 10/2004 | Uzumaki et al. | |
| 6,842,801 B2 | 1/2005 | Yamada | |
| 6,928,525 B1 | 8/2005 | Ebner et al. | |
| 6,947,234 B2 | 9/2005 | Lamberts et al. | |
| 6,950,967 B1 | 9/2005 | Brunnett et al. | |
| 6,973,553 B1 | 12/2005 | Archibald, Jr. et al. | |

(Continued)

OTHER PUBLICATIONS

U.S. Appl. No. 11/950,287, filed Dec. 4, 2007.

(Continued)

*Primary Examiner* — Jason C Olson

(57) ABSTRACT

A disk drive is disclosed comprising a head actuated over a disk, the disk having a plurality of data tracks, wherein a first plurality of data tracks comprises a first plurality of defect scanned data sectors and a second plurality of data tracks comprises a second plurality of unscanned data sectors. The second plurality of data tracks is divided into a plurality of defect zones. A first number of write commands are received from a host to write data to a first defect zone. A first data sector in the first defect zone is defect scanned in response to the first number of write commands to the first defect zone.

24 Claims, 9 Drawing Sheets

U.S. PATENT DOCUMENTS

| | | | |
|---|---|---|---|
| 6,995,933 | B1 | 2/2006 | Codilian et al. |
| 7,099,993 | B2 | 8/2006 | Keeler |
| 7,106,547 | B1 | 9/2006 | Hargarten et al. |
| 7,143,203 | B1 | 11/2006 | Altmejd |
| 7,173,782 | B2 | 2/2007 | Ikeda et al. |
| 7,274,639 | B1 * | 9/2007 | Codilian et al. ........... 369/53.17 |
| 7,345,837 | B1 | 3/2008 | Schreck et al. |
| 7,461,202 | B2 | 12/2008 | Forrer, Jr. et al. |
| 7,477,465 | B2 | 1/2009 | Yu |
| 7,626,908 | B2 | 12/2009 | Nakagawa et al. |
| 2003/0174549 | A1 | 9/2003 | Yaguchi et al. |
| 2006/0066971 | A1 | 3/2006 | Alex et al. |
| 2006/0203661 | A1 | 9/2006 | Chen et al. |
| 2008/0082778 | A1 | 4/2008 | Inoue et al. |
| 2008/0130153 | A1 | 6/2008 | Lee et al. |

OTHER PUBLICATIONS

U.S. Appl. No. 11/950,324, filed Dec. 4, 2007.

Charles M. Kozierok, ("Logical Block Addressing (LBA)"), Apr. 17, 2001, pp. 1-2, http://www.pcguide.com/ref/hdd/bios/modesLBA-c.html.

Charles M. Kozierok, ("Seek Time"). Apr. 17, 2001, pp. 1-3, http://www.pcguide.com/ref/hdd/perf/perf/spec/posSeek-c.html.

Walter A. Burkhard et al., Rotational Position Optimization (RPO) Disk Scheduling, First Conference on File and Storage Technologies (FAST '02), Jul. 16, 2001, pp. 1-11.

* cited by examiner

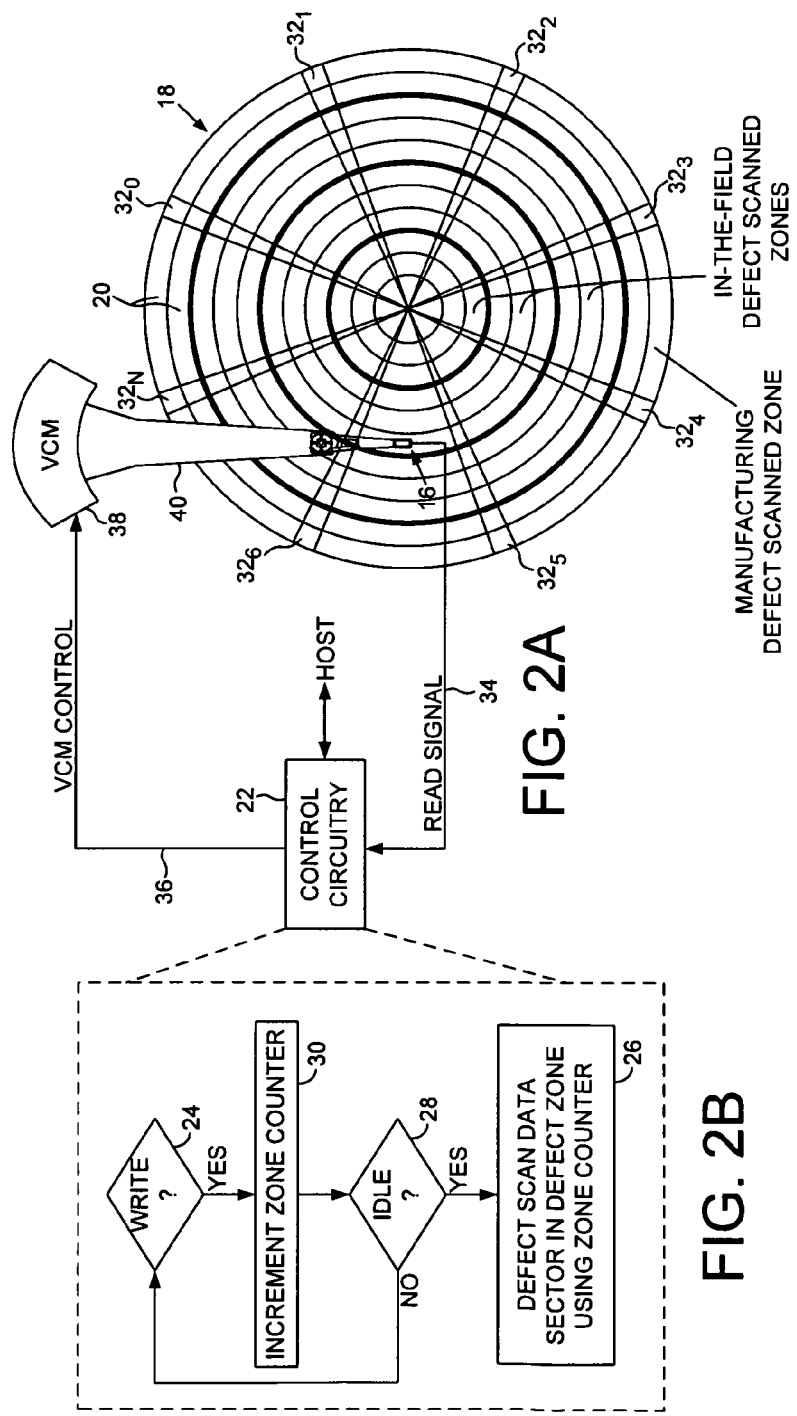

DISK DRIVE PRIORITIZING IN-THE-FIELD DEFECT SCANNING BASED ON NUMBER OF WRITE OPERATIONS IN EACH OF A PLURALITY OF DEFECT ZONES

BACKGROUND

Description of the Related Art

Disk drives comprise a disk and a head connected to a distal end of an actuator arm which is rotated about a pivot by a voice coil motor (VCM) to position the head radially over the disk. The disk typically comprises a number of concentric data tracks each partitioned into a number of data sectors. Access operations are performed by seeking the head to a target data track, and performing a write/read operation on the data sectors within the data track. The disk typically comprises embedded servo sectors having position information recorded therein, such as coarse position information (e.g., a track address) and fine position information (e.g., servo bursts). A servo controller processes the servo sectors to position the head over the target data track. FIG. 1 shows a prior art disk format comprising a plurality of tracks that are banded together to form a plurality of physical zones.

Each data sector is typically assigned a physical block address (PBA) which is accessed indirectly through a logical block address (LBA) to facilitate mapping out defective data sectors. A PBA associated with defective data sectors may simply remain unmapped if found during manufacturing, or if a data sector becomes defective while in-the-field (grown defect), the LBA may be remapped to the PBA of a spare data sector (and the data relocated to the spare data sector). The process of initially mapping the LBAs to PBAs and mapping out defective PBAs is referred to as "formatting" the disk.

Scanning for defective sectors during manufacturing of the disk drive typically involves writing a special test pattern to each data sector (e.g., a 2T pattern) and reading the test pattern to identify defects. For example, a drop in the amplitude of the read signal may indicate a defect, or a defect filter matched to a defect signature may indicate a defect, or a number of bit errors exceeding a threshold may indicate a defect, etc. However, defect scanning every data sector in a disk drive represents a significant bottleneck in the manufacturing process thereby increasing the manufacturing cost.

BRIEF DESCRIPTION OF THE DRAWINGS

FIG. 2A shows a disk drive according to an embodiment of the present invention comprising a disk having a first plurality of defect scanned data sectors and a second plurality of data tracks comprising a second plurality of unscanned data sectors, wherein the second plurality of data tracks are divided into a plurality of defect zones.

FIG. 2B is a flow diagram according to an embodiment of the present invention wherein during an idle mode the data sectors in the defect zones are defect scanned based on a number of write operations to each defect zone.

DETAILED DESCRIPTION OF EMBODIMENTS OF THE INVENTION

Figure 1:
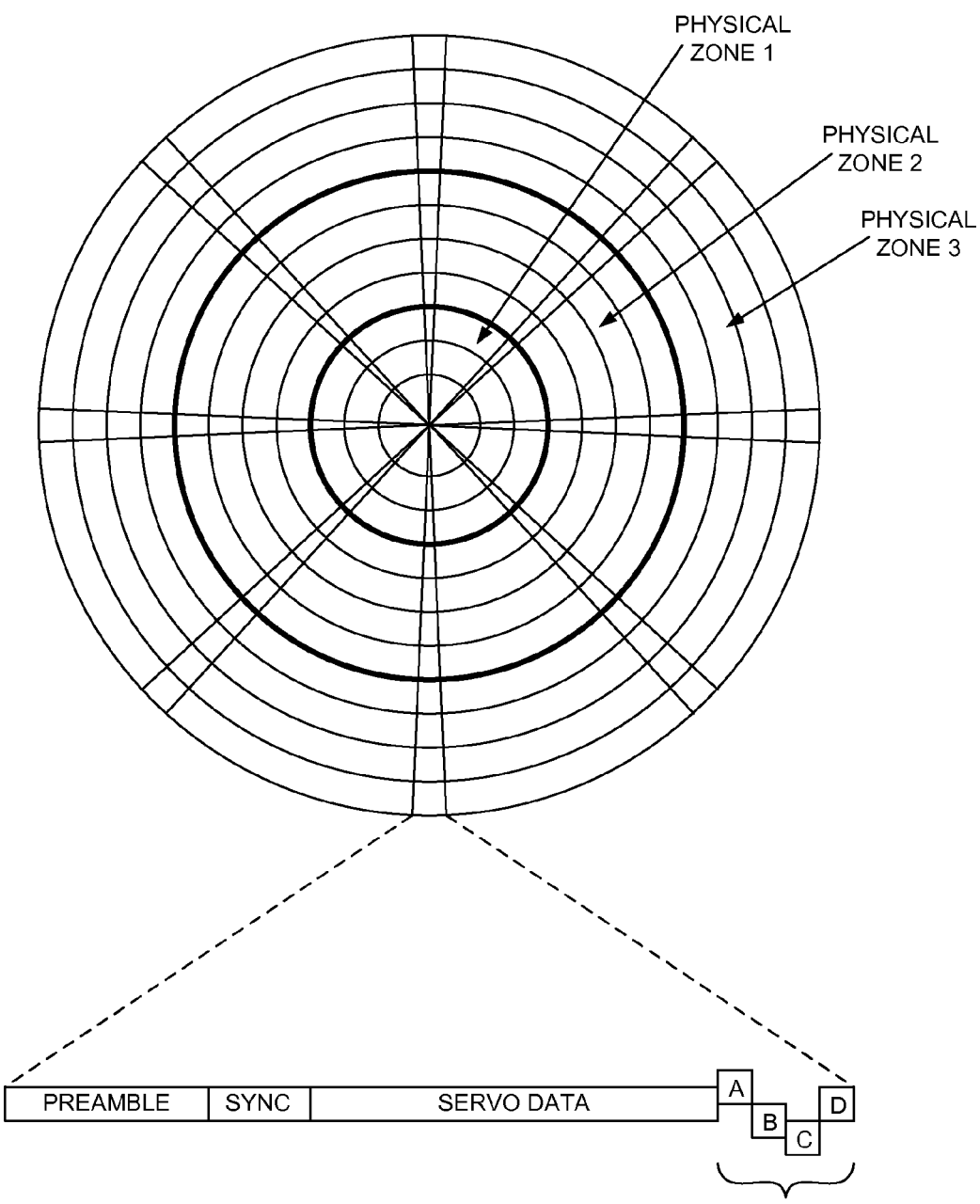
FIG. 1 shows a prior art disk format comprising a plurality of tracks that are banded together to form a plurality of physical zones.

FIG. 2A shows a disk drive according to an embodiment of the present invention comprising a head 16 actuated over a disk 18, the disk having a plurality of data tracks 20, wherein a first plurality of data tracks comprises a first plurality of defect scanned data sectors and a second plurality of data tracks comprises a second plurality of unscanned data sectors. The second plurality of data tracks is divided into a plurality of defect zones. The disk drive further comprises control circuitry 22 operable to execute the flow diagram of FIG. 2B, wherein a first number of write commands are received from a host to write data to a first defect zone (step 24). A first data sector in the first defect zone is defect scanned in response to the first number of write commands to the first defect zone (step 26).

In the embodiment of FIG. 2A, the disk 18 comprises a plurality of servo sectors $32_0$-$32_N$ that define the plurality of data tracks 20. The control circuitry 22 processes a read signal 34 to demodulate the servo sectors $32_0$-$32_N$ into a position error signal (PES). The PES is filtered with a suitable compensation filter to generate a control signal 36 applied to a voice coil motor (VCM) 38 which rotates an actuator arm 40 about a pivot in order to position the head 16 radially over the disk 18 in a direction that reduces the PES. The servo sectors $32_0$-$32_N$ may comprise any suitable position information, such as a track address for coarse positioning and servo bursts for fine positioning.

In the embodiment of FIG. 2A, the first plurality of data tracks are defect scanned during a manufacturing process of the disk drive. In this manner, the disk drive is able to store initial data (e.g., a host operating system) in the first plurality of data tracks immediately upon shipping the disk drive. While the disk drive is deployed in-the-field, the data sectors in the second plurality of data tracks are defect scanned during an idle mode (step 28) of the disk drive. In various embodiments of the present invention, the number of write operations to each defect zone is maintained by incrementing a zone counter (step 30), and then the defect zones are defect scanned in response to the zone counters (step 26).

Figure 2C:
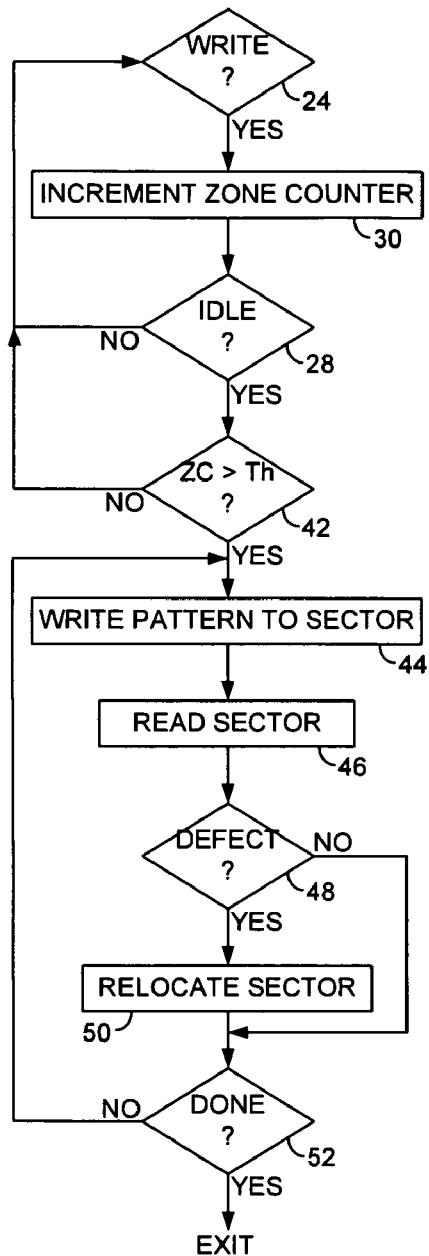
FIG. 2C is a flow diagram according to an embodiment of the present invention wherein when a zone counter exceeds a threshold the corresponding defect zone is defect scanned.

In an embodiment shown in the flow diagram of FIG. 2C, a defect zone is defect scanned when the corresponding zone counter exceeds a threshold (step 42). However, any suitable prioritizing criteria may be employed in the embodiments of the present invention, such as by expediting a defect zone if a frequency of the write operations exceeds a threshold. In another embodiment, defect scanning the defect zones may be ordered relative to each zone counter. For example, if a second zone counter of a second defect zone exceeds a first zone counter of a first defect zone, the control circuitry may defect scan the second defect zone before the first defect zone. In another embodiment, a similar ordering may be based on the frequency of write operations to each zone (i.e., the frequency that the zone counters are being incremented).

Any suitable defect scan may be employed in the embodiments of the present invention, wherein in FIG. 2C a pattern is written to each data sector (step 44), such as a 2T pattern. The pattern is then read from the data sector (step 46) and the read signal processed to detect a defect (step 48). Any suitable technique may be employed to detect a defective data sector, such as detecting fluctuations in the read signal amplitude, measuring an error between expected samples and the read signal samples, employing a defect filter matched to a defect signature in the read signal, or by measuring the number of bit errors and/or the number of error correction code (ECC) errors in the data sector. In another embodiment, instead of writing a pattern to the data sector, the data written to each data sector during manufacturing (e.g., zeros) is read to detect defects during the defect scan. If a data sector is deemed defective (step 48), the defective data sector is relocated to a spare data sector (step 50). The flow diagram is then repeated starting at step 44 until all of the data sectors of the defect zone have been defect scanned (step 52).

Figure 3A:
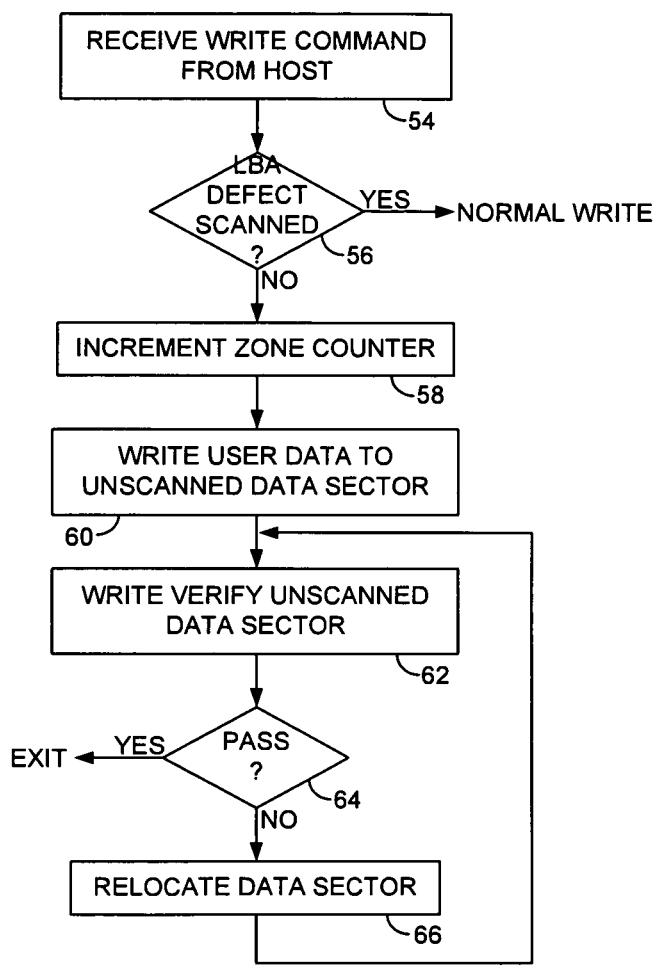
FIG. 3A is a flow diagram according to an embodiment of the present invention wherein when a write command is received to write to an unscanned data sector, the data sector is write-verified.

FIG. 3A is a flow diagram according to an embodiment of the present invention wherein a write command is received from the host (step 54) including a logical block address (LBA) identifying a data sector to be written. If the data sector corresponding to the LBA has not yet been defect scanned (step 56), the zone counter of the defect zone is incremented (step 58) and the user data received from the host is written to the unscanned data sector (step 60). The unscanned data sector is then write verified (step 62) by attempting to read the user data from the data sector. If the write verify fails (step 64), the data sector is relocated (step 66).

The write verify operation helps ensure an unscanned data sector does not contain a defect that would render the data sector unrecoverable. However, executing a write verify operation on each written data sector is undesirable since it takes a significant amount of time. Therefore, in one embodiment the control circuitry tracks the number of write operations to each defect zone and then prioritizes the idle mode defect scanning based on the zone counters.

Figure 3B:
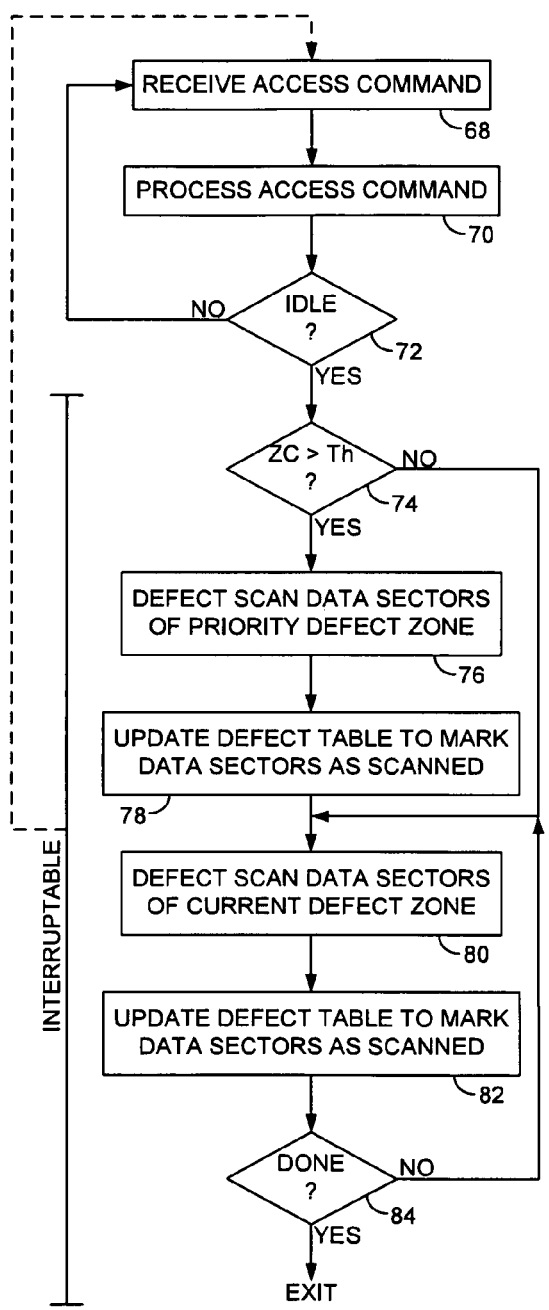
FIG. 3B is a flow diagram according to an embodiment of the present invention wherein during an idle mode the defect zones are defect scanned in a predetermined order, unless a zone counter exceeds a threshold in which case the corresponding defect zone is elevated in priority.

FIG. 3B is a flow diagram according to an embodiment of the present invention wherein the control circuitry receives access commands from the host (step 68) and processes the access commands (step 70). If an access command is not received from the host for a predetermined interval (step 72), the control circuitry enters the idle mode where it performs background tasks such as defect scanning the data sectors. If one of the zone counters exceeds a threshold (step 74), the data sectors of the corresponding defect zone are prioritized for defect scanning (step 76). After defect scanning all of the data sectors of the defect zone, a defect table is updated to reflect that the data sectors have been scanned (step 78). If none of the zone counters exceed a threshold (step 74), or if all of the prioritized defect zones have been scanned, then the next defect zone is scanned according to a predetermined order (step 80), and the defect table updated to reflect that the data sectors have been scanned (step 82). This process repeats until all of the defect zones have been scanned (step 84). In the embodiment of FIG. 3B, the idle mode may be interrupted if the control circuitry receives a new access command (read or write) from the host. When the defect scan is interrupted in the middle of a defect zone, the control circuitry maintains suitable pointers to restart the defect scan at the appropriate data sector within the current defect zone.

Figure 4A:
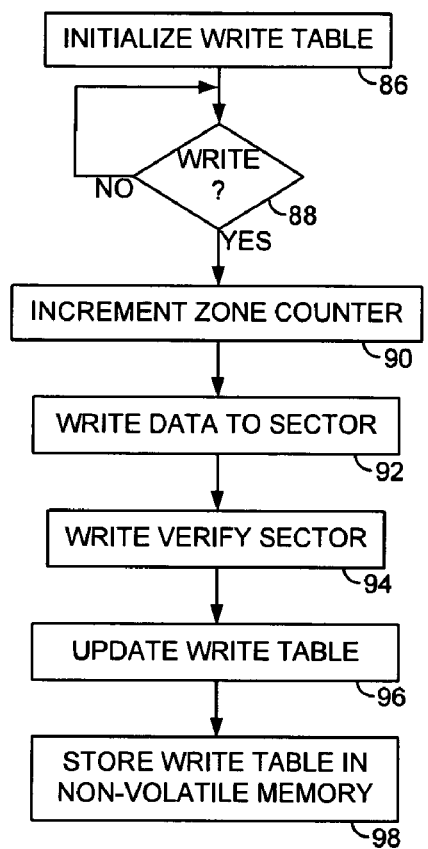
FIG. 4A is a flow diagram according to an embodiment of the present invention wherein a write table is updated each time a write operation is performed on a data sector.

FIG. 4A is a flow diagram according to an embodiment of the present invention wherein a write table is initialized (step 86). When a write operation is received from the host to write user data to an unscanned data sector (step 88), the corresponding zone counter is incremented (step 90), the data is written to the unscanned data sector (step 94) and the data sector is write verified (step 94). The write table is updated (step 96) to reflect that the unscanned data sector has been previously written and write verified, and the write table is stored in a non-volatile memory, such as on the disk (step 98).

Figure 4B:
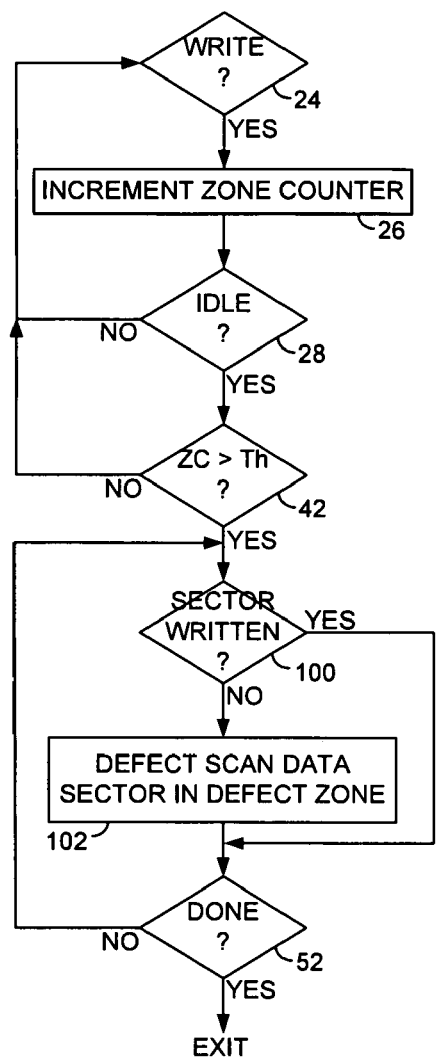
FIG. 4B is a flow diagram according to an embodiment of the present invention wherein if a data sector in a defect zone was previously written, the defect scan of the data sector is skipped.

FIG. 4B shows a flow diagram according to an embodiment of the present invention wherein if an unscanned data sector has been previously written (step 100) as determined from the write table, then the step of defect scanning the data sector (step 102) is skipped. In this embodiment, if an unscanned data sector is written and successfully write verified, then it is assumed that the data sector is reliable (non-defective) and therefore the defect scan of the data sector can be skipped.

Figure 5A:
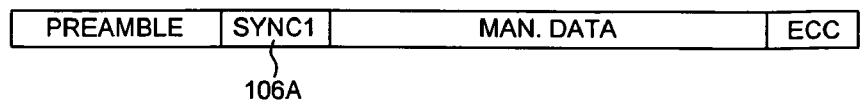
FIGS. 5A and 5B illustrate an embodiment of the present invention wherein a first sync mark is written during a manufacturing write operation, and a second sync mark is written during an in-the-field write operation in order to detect whether a data sector is considered written by the host.
Figure 5B:
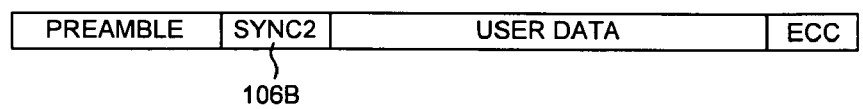

FIGS. 5A and 5B illustrate an embodiment of the present invention wherein instead of using a write table to identify unwritten data sectors, the data sectors are written with first and second sync marks 106A and 106B. When writing to a data sector during manufacturing, a first sync mark 106A is written to the data sector, and when writing to the same data sector in response to a host command while in-the-field, a second sync mark 106B is written to the data sector. In this manner, when defect scanning a defect zone, whether a data sector has been previously written by the host can be determined by evaluating which sync mark is detected. That is, if the first sync mark 106A is detected, the data sector is considered unwritten, and if the second sync mark 106B is detected, the target data sector is considered written.

Figure 6A:
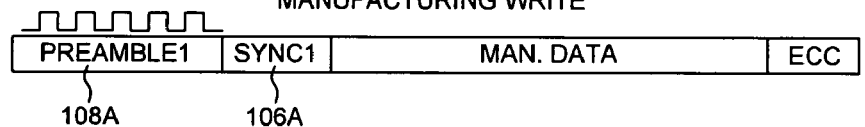
FIGS. 6A and 6B illustrate an embodiment of the present invention wherein a first preamble ending in a first phase is recorded preceding the first sync mark, and a second preamble ending in a second phase is recorded preceding the second sync mark.
Figure 6B:
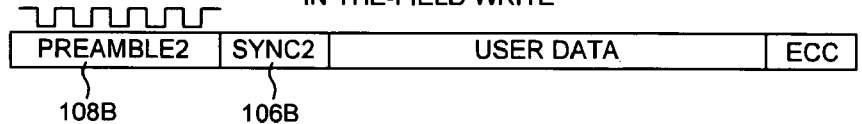

FIGS. 6A and 6B illustrate an embodiment of the present invention wherein the preamble of a data sector is used to increase the reliability of differentiating between the first sync mark 106A and the second sync mark 106B. In this embodiment, a first preamble 108A is written to the data sector preceding the first sync mark 106A during manufacturing, and a second preamble 108B is written to the data sector preceding the second sync mark 106B while in-the-field, wherein the first preamble 108A ends with a phase (e.g., "++" or "−−") that is different from the phase (e.g., "+−" or "−+") of the second preamble 108B. In this manner, the second sync mark 106B will be considered accurately detected (and the data sector considered written by the host) only if the preamble of the data sector ends in the correct phase (i.e., only if the second preamble 108B is detected).

Figure 7A:
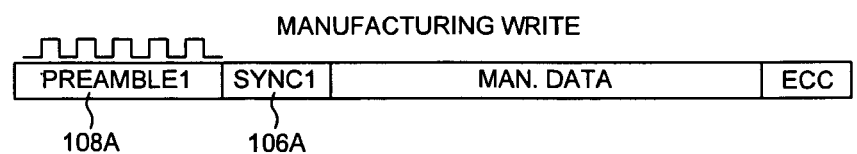
FIGS. 7A and 7B illustrate an embodiment of the present invention wherein the first and second preambles are used to determine whether a data sector has been written by the host.
Figure 7B:
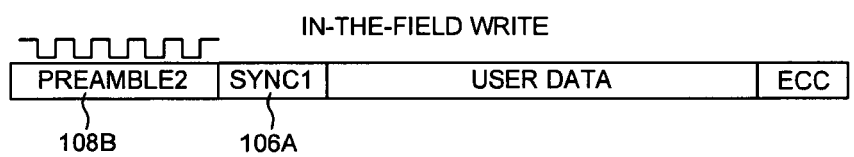

FIGS. 7A and 7B illustrate an embodiment of the present invention wherein the same sync mark 106A may be written during manufacturing and while in-the-field. However, a first preamble 108A ending in a first phase is written during manufacturing, and a second preamble 108B ending in a second phase is written while in-the-field. In this embodiment, a data sector will be considered unwritten by the host if the first preamble 108A is detected, and written by the host if the second preamble 108B is detected. The preamble that is detected can be determined by evaluating the read signal samples of the preamble (e.g., the last two samples of the preamble) after detecting the sync mark.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk comprising a plurality of data tracks, wherein a first plurality of data tracks comprises a first plurality of defect scanned data sectors and a second plurality of data tracks comprises a second plurality of unscanned data sectors;
    a head actuated over the disk; and
    control circuitry operable to;
        divide the second plurality of data tracks into a plurality of defect zones;
        receive a first number of write commands from a host to write data to a first defect zone; and
        defect scan a first data sector in the first defect zone in response to the first number of write commands to the first defect zone.

2. The disk drive as recited in claim 1, wherein the control circuitry is further operable to defect scan the first data sector when the first number of write commands to the first defect zone exceeds a threshold.

3. The disk drive as recited in claim 1, wherein the control circuitry is further operable to defect scan the first data sector when a frequency of the first write commands to the first defect zone exceeds a threshold.

4. The disk drive as recited in claim 1, wherein the control circuitry is further operable to defect scan the first data sector by:
    writing a pattern to the first data sector; and
    reading the pattern from the first data sector.

5. The disk drive as recited in claim 1, wherein the control circuitry is further operable to:
    write user data received from the host in connection with one of the write commands to a second data sector of the first defect zone;
    write verify the second data sector; and
    when the write verify fails, relocate the second data sector.

6. The disk drive as recited in claim 5, wherein after defect scanning the first data sector the control circuitry is further operable to:
    write user data received from the host in connection with one of the write commands to the first data sector of the first defect zone; and
    skip the write verify of the first data sector.

7. The disk drive as recited in claim 1, wherein the control circuitry is further operable to:
    receive a second number of write commands from the host to write data to a second defect zone; and
    defect scan a second data sector in the second defect zone in response to the first number of write commands to the first defect zone and the second number of write commands to the second defect zone.

8. The disk drive as recited in claim 7, wherein the control circuitry is further operable to:
    increment a first zone counter each time a write command is received to write data to the first defect zone; and
    increment a second zone counter each time a write command is received to write data to the second defect zone.

9. The disk drive as recited in claim 8, wherein the control circuitry is operable to defect scan the second data sector before the first data sector when the second zone counter exceeds the first zone counter.

10. The disk drive as recited in claim 9, wherein during an idle time the control circuitry is further operable to select one of the first defect zone and the second defect zone for defect scanning.

11. The disk drive as recited in claim 1, wherein the control circuitry is further operable to update a defect table identifying the first data sector as defect scanned.

12. The disk drive as recited in claim 5, wherein the control circuitry is further operable to:
    update a write table identifying the second data sector as written; and
    when defect scanning data sectors in the first defect zone, skip the defect scan of the second data sector.

13. A method of operating a disk drive, the disk drive comprising a head actuated over disk, the disk comprising a plurality of data tracks, wherein a first plurality of data tracks comprises a first plurality of defect scanned data sectors and a second plurality of data tracks comprises a second plurality of unscanned data sectors, the method comprising:
    dividing the second plurality of data tracks into a plurality of defect zones;
    receiving a first number of write commands from a host to write data to a first defect zone; and
    defect scanning a first data sector in the first defect zone in response to the first number of write commands to the first defect zone.

14. The method as recited in claim 13, further comprising defect scanning the first data sector when the first number of write commands to the first defect zone exceeds a threshold.

15. The method as recited in claim 13, further comprising defect scanning the first data sector when a frequency of the first write commands to the first defect zone exceeds a threshold.

16. The method as recited in claim 13, wherein defect scanning the first data sector comprises:
    writing a pattern to the first data sector; and
    reading the pattern from the first data sector.

17. The method as recited in claim 13, further comprising:
    writing user data received from the host in connection with one of the write commands to a second data sector of the first defect zone;
    write verifying the second data sector; and when the write verifying fails, relocating the second data sector.

18. The method as recited in claim 17, wherein after defect scanning the first data sector:
writing user data received from the host in connection with one of the write commands to the first data sector of the first defect zone; and
skipping the write verify of the first data sector.

19. The method as recited in claim 13, further comprising:
receiving a second number of write commands from the host to write data to a second defect zone; and
defect scanning a second data sector in the second defect zone in response to the first number of write commands to the first defect zone and the second number of write commands to the second defect zone.

20. The method as recited in claim 19, further comprising:
incrementing a first zone counter each time a write command is received to write data to the first defect zone; and
incrementing a second zone counter each time a write command is received to write data to the second defect zone.

21. The method as recited in claim 20, further comprising defect scanning the second data sector before the first data sector when the second zone counter exceeds the first zone counter.

22. The method as recited in claim 21, wherein during an idle time further comprising selecting one of the first defect zone and the second defect zone for defect scanning.

23. The method as recited in claim 13, further comprising updating a defect table identifying the first data sector as defect scanned.

24. The method as recited in claim 17, further comprising:
updating a write table identifying the second data sector as written; and
when defect scanning data sectors in the first defect zone, skipping the defect scan of the second data sector.

* * * * *